United States Patent [19]

Pinto

[11] 4,111,451
[45] Sep. 5, 1978

[54] MULTI-TRAILER, DOLLY-CONNECTED, MOVABLE-AXLE, CONTAINERIZED CARGO TRAILER SYSTEM

[76] Inventor: Robert R. Pinto, 2900 Federal St., Camden, N.J. 08105

[21] Appl. No.: 816,047

[22] Filed: Jul. 15, 1977

Related U.S. Application Data

[63] Continuation-in-part of Ser. No. 788,182, Apr. 18, 1977.

[51] Int. Cl.² .............................................. B62D 53/06
[52] U.S. Cl. ................................ 280/408; 280/423 R; 280/474
[58] Field of Search ............. 280/80 B, 423 R, 423 A, 280/408, 474, 476 R, 80 R, 80 B, 81 R, 86

[56] References Cited
U.S. PATENT DOCUMENTS

| | | | |
|---|---|---|---|
| 2,841,094 | 7/1958 | Schumacher | 280/423 R X |
| 3,151,880 | 10/1964 | Black | 280/408 |
| 3,410,576 | 11/1968 | Turpen | 280/423 R |
| 3,561,790 | 2/1971 | Jurgens | 280/423 A |

Primary Examiner—Joseph F. Peters, Jr.
Assistant Examiner—R. Schrecengost
Attorney, Agent, or Firm—Benasutti Associates, Ltd.

[57] ABSTRACT

A novel system is disclosed for carrying containerized loads, which system basically comprises at least two trailers, at least one of which may be pulled from either end, such that a novel dolly may be utilized to interconnect said trailers for transport, while at the same time facilitating end loading cargo dock access to a plurality of containers mounted on each trailer. Additionally, a novel dolly is disclosed for coupling two trailers together for hauling, which dolly preferably comprises a plurality of axles, each of which is movable with respect to the frame of the dolly and with respect to each other to facilitate multi-directional trailer hauling, better weight distribution, easy hook-up, and convenient storage. The preferred embodiment dolly comprises means for limiting the pivotal action of the dolly with respect to its associated trailers, particularly during hook-up, loading or unloading operations. Finally, the tracking members of each of the trailers and dolly are provided with service blocks which facilitate the easy removal or addition of one or more axles from these units.

8 Claims, 4 Drawing Figures

MULTI-TRAILER, DOLLY-CONNECTED, MOVABLE-AXLE, CONTAINERIZED CARGO TRAILER SYSTEM

CROSS-REFERENCE TO RELATED APPLICATIONS

The present application is a continuation-in-part of my prior co-pending patent application Ser. No. 788,182, filed Apr. 18, 1977 entitled "Multiple Hook-Up, Movable Axle, Container Cargo Trailer", which application is specifically incorporated by reference as if fully set forth herein.

BACKGROUND OF THE INVENTION

The present invention generally relates to trailers which are adapted to be hooked to and pulled by tractors. More particularly, the present invention relates to trailers which are suited for containerized shipments, such as those commonly handled by air cargo and/or sea transporters.

Commercially available trailers have changed only slightly over the last thirty years. These trailers comprise a load bed, a kingpin assembly adapted to be engaged by a tractor, one or more sets of wheels, and various peripheral equipment such as lights, bumpers, etc., particularly as required by the Interstate Commerce Commission. Generally, the load bed of a trailer is designed to facilitate the particular load type to be handled, as for example, a load bed or undercarriage adapted to carry a tank for hauling liquids, a flat bed configuration for hauling items secured thereto, or a van configuration for confining loose loads.

Any commercially acceptable trailer or trailering system must be compatible with standard tractors which have devices known to the industry as "fifth wheels", mounted thereon which are adapted to grip and pivot with respect to the kingpins of the trailers to which they are attached. The coupling operation of a fifth wheel to a kingpin merely involves moving the tractor so that the kingpin is guided through a tapered slot in the fifth wheel to an appropriate position, after which a handle on the side of the fifth wheel is pulled to close jaws around the kingpin to complete the tractor-trailer engagement.

Over the last thirty years, the trend in trailer construction has been to lighten the weight of the trailer while maintaining suitable strength characteristics so that heavier payloads could be accommodated while meeting the various weight requirements imposed by each state, particularly concerning the weight carried by each axle and the bridging distance permitted between axles. Accordingly, most trailers which have been constructed in recent years have been built with abbreviated understructures disposed in the vicinity of the rear axles, thereby substantially reducing the weight of the understructure while providing sufficient support in the axle region to handle most loads. Similarly, the use of "sliders" in connection with these abbreviated understructures has gained wide-spread acceptance in the industry. These sliders generally allow a double axle assembly supporting the rear of the trailer to be moved relative to the underside of the trailer for a distance of approximately nine feet (for a forty foot trailer), so that, depending upon the particular load and state weight requirements, a load may be appropriately balanced between the tractor and trailer. In order to reduce tread wear and increase the efficiency of a given trailer when that trailer is being pulled in an empty or partially loaded condition, the industry has also, when appropriate, utilized axles which may be selectively retracted vertically away from the road surface to reduce the number of tires in contact with that surface when that axle is not needed.

In spite of the approaches discussed above, most trailers presently in use are subject to certain drawbacks which result in less efficient load transportation and higher maintenance and service costs. In particular, virtually all trailers now in use are equipped with landing gears which, during the hauling thereof, are folded under the trailer body. These may be lowered to support the front end of the trailer when that end of the trailer is not supported by a tractor. Since the trailers themselves are quite heavy, landing gears are normally powered by variable speed winches which move the landing gears into position. Although vital when needed, landing gears are basically superfluous to the operation of each trailer during hauling. It has not been economic, therefore, to construct landing gears which are so rugged and durable as to adequately support certain trailers in the fully loaded condition. Further, these landing gears are particularly prone to failure or damage during the hook-up operation when a tractor backing into the trailer to grab the kingpin may exert substantial torques on the landing gear.

Very recently, the above described problems of cargo shipment have been complicated by the increasing use of containerized shipments, and particularly shipments of containers having dimensions approximately ten or twenty feet long and the full width of a trailer body. While these relatively large containers have gained widespread acceptance in the air and sea transport industries, they have created considerable difficulties for truckers who normally deliver the contents of such containers locally, as for example, to standard loading docks where final unloading of the transported materials is to take place. Conventionally, twenty foot containers are provided with a single set of cargo doors disposed at one end thereof. Accordingly, as a standard procedure, many haulers have adapted twenty foot cargo beds to receive such containers, to buckle those containers to those beds and to transport each container individually to its destination.

While it may appear that a conventional flat bed, forty foot long trailer could be adapted to handle two twenty foot trailers, in reality this configuration is not feasible if it is desired that the contents of each of the containers are to be unloaded while the containers are on the bed, as is normally the case. This is because cargo access at the end of at least one of the two containers is restricted by door placement. To attempt to unload a twenty foot container from the side is not economical since almost all loading docks are adapted for end loading trailers.

Very recently, one approach which has been taken by Seaboard World Airlines is the provision of two couple-able chassis, each of which is intended to receive a single twenty foot cargo container. Essentially, each chassis is a twenty foot trailer comprising a load bed, landing gear, and axle assembly which is mounted on a sliding sub-chassis. Each of these trailers may be coupled together to be pulled by a single tractor according to the following procedure a first of the trailers having the container positioned thereon is appropriately located with the landing gears and struts in the down position while the second trailer is coupled to a trailer and the landing gear put in the up position. The wheels on the second trailer are then locked and the cab moved forward so that the sub-chassis and wheels of the second trailer extend backward beyond the end of the second container. The chassis may be operated in this position or alternatively may be backed into the first trailer so that the kingpin of the first trailer will engage with the locking guides in the extended sub-chassis of the second trailer. The landing gear of the first trailer may then be moved to the up position after which the slider on the second trailer is again released and the entire unit moved forward until the wheels of the second trailer have extended even further into a correct position for a one hundred and twenty inch tandem setting, whereupon the slider of the second trailer is again locked and the slider of the first trailer released and brake set. The entire unit may then move backwards relative to the wheels of the first trailer until the two suspensions automatically unite into a load equalizing tandem wherein the axles of the first and second chassis are adjacent to each other.

As seen from the above description, while the coupleable trailer approach will facilitate the transport of two twenty foot containers by a single tractor, this benefit is achieved at the expense of a relatively elaborate coupling procedure which requires the tractor operator to leave the cab five times to couple or un-couple one trailer from the other. Additionally, in order to effect delivery of the contents of the containers, it is necessary to go through the coupling and uncoupling procedure many times in order to facilitate access to each of the containers. Accordingly, although this system has achieved some success, the complexity of this system and its susceptibility to damage, particularly landing gear damage, during the coupling and uncoupling operation, has limited its widespread application in the industry.

When it is desired to haul greater loads than may be easily accommodated on a single trailer, the industry has occasionally resorted to the use of "dogs", which are additional trailers, usually with pivotal front axles, attached in tandem to the preceding trailer, usually through a hook-and-eye or ball hitch arrangement. While this type of transport has achieved some success, its use has been severely limited by safety problems as well as by difficulties in distributing loads between the front and rear trailers and in handling the rear trailer, as for example, during unloading and tight-quarter maneuvering.

SUMMARY OF THE INVENTION

I have invented an improved cargo trailer system comprising a plurality of trailers with a dolly coupled therebetween, each of which trailers may be loaded and unloaded from either end, may be pulled or maneuvered from either end, may not incorporate a landing gear or other auxiliary supporting device, may be independently supported by its axles and may safely haul optimally balanced, multiple container loads over long distances.

In the preferred embodiment, the trailer system of the present invention comprises two or more elongate trailers adapted to receive a plurality of end loading containers. Generally, at each end of each trailer bed coupling portions having kingpins positioned with clearance therearound such that a tractor may be attached to either kingpin to pull the trailer from either end. A novel dolly assembly is provided having a plurality of oppositely directed "fifth wheels" mounted on either end thereof so that each dolly fifth wheel may be attached to appropriate kingpins of tandem trailers to interconnect those trailers for transport. In the preferred embodiment, each trailer has, spanning substantially the entire distance between coupling portions, continuous track means on which a plurality of axle assemblies are mounted for sliding movement relative to each other as well as with respect to their respective trailer cargo beds. The preferred embodiment dolly has a frame comprising continuous track means spanning substantially its entire length which is similarly fitted with one or more axle assemblies also mounted for sliding movement relative to each other, as well as with respect to the dolly frame. Where a plurality of axle asemblies are used for each trailer and for the dolly, the need for any landing gear is eliminated, since each unit is fully self-supporting when the axle assemblies are disposed near to or at opposite ends of their respective tracks. Each of the coupling portions are provided with means in addition to the kingpin for mating with a selectively extendable pin which may be incorporated as part of the fifth wheel of the dolly assembly, or alternatively, as part of the coupling portion of the trailer. Extended, this pin mates with a complementally formed bore in a portion of the fifth wheel to selectively prevent pivoting of the dolly with respect to its associated trailer(s).

In order to facilitate the addition, substitution or removal of axles from either the trailers or the dolly, each of the aforementioned tracks is fitted with service brackets which are easily removable to allow introduction or removal of axles from the track. Accordingly, a primary object of the present invention is the provision of a containerized cargo trailer system exhibiting superior cargo-handling flexibility.

Another aim of the present invention is the provision of a trailering system which provides for the safe tandem hauling of a plurality of distinct end-loaded cargo trailers.

A further aim of the present invention is the provision of a trailer dolly which may be easily coupled between a plurality of trailers to safely link the same while optimizing weight distribution and maneuverability.

Another aim of the present invention is the provision of a trailer system which is adapted for receiving and transporting a plurality of end-loading container cargo units on a plurality of tandem hitched trailers, each of which containers may easily be maneuvered for end-access to a convential loading dock.

These and other objects of the present invention will become apparent from the following more detailed description.

DESCRIPTION OF THE PREFERRED EMBODIMENT

Figure 1:
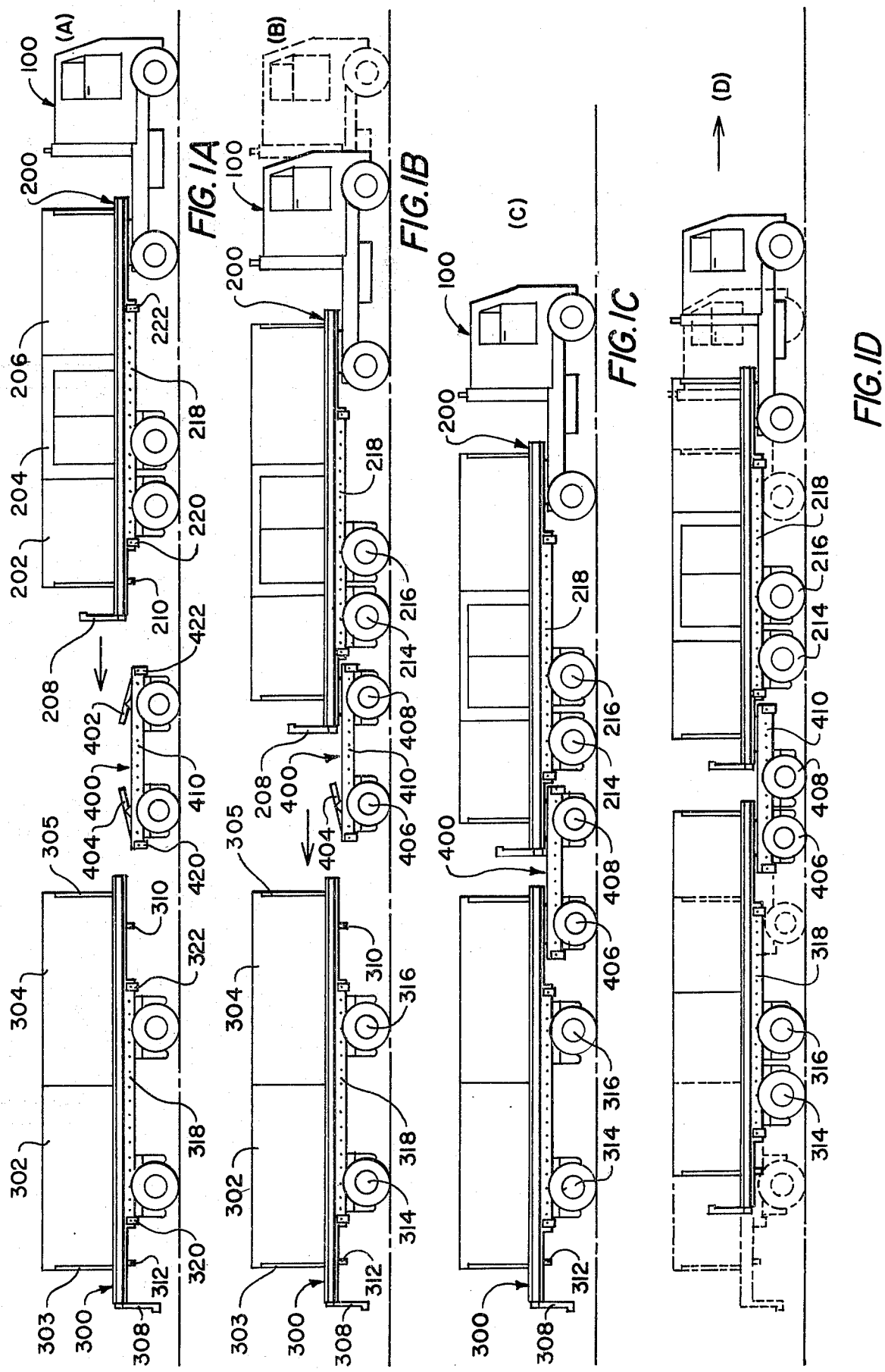
FIG. 1 is a side elevation of the preferred embodiment trailers and trailer dolly showing cargo containers loaded thereon wherein the various hook-up steps for trailer hitching and load balancing are illustrated.

Although specific forms of the invention have been selected for illustration in the drawings, and the following description is drawn in specific terms for the purpose of describing these forms of the invention, this description is not intended to limit the scope of the invention which is defined in the appended claims.

The present invention relates to a cargo trailer system comprising at least two cargo trailers and a dolly means for selectively hitching those trailers in tandem. Unless otherwise specified in the present specification, the preferred trailers for use with the dolly means and in the trailer system herein described are those trailers which are more fully described in my co-pending patent application Ser. No. 788,182, filed Apr. 18, 1977 entitled "Multiple Hook-Up, Movable Axle, Container Cargo Trailer", which application is incorporated herein by reference.

Referring to FIG. 1, a tractor designated generally 100 is shown hitched to a trailer 200 constructed in accordance with my aforementioned patent application, which trailer has loaded thereon cargo containers 202, 204 and 206. Referring to view A, the coupling operation is illustrated between trailer 200, wherein the pivotal bumper 208 has been moved to the upper position, and a preferred embodiment dolly 400. In view A the tractor 100 and trailer 200 are moved towards the dolly designated generally 400, as shown. In FIG. 1, a dolly having two axles is illustrated, the brakes of the axle means of which dolly have been locked to facilitate easy coupling between trailer kingpin 210 and front dolly fifth wheel 402.

In view B of FIG. 1, the attachment between the dolly fifth wheel 402 and kingpin 210 has been completed. In view B, the previous trailer position is shown in phantom. As will be described more fully hereinafter, the dolly may now be interlocked with respect to trailer 200 to prevent pivotal movement of the dolly 400 with respect to trailer 200 to facilitate the next backing maneuver, which is linkage with trailer 300, which is to be pulled as the "dog". The rear trailer 300 is illustrated loaded with two containers 302 and 304, each of which has end cargo doors 303 and 305, respectively.

At the present time, commercial cargo containers generally are made in ten, twenty, and forty foot lengths. Almost all of these cargo containers have end mounted doors (as illustrated) and must be unloaded from the end, as for example, to a loading dock. Depending upon the desired length of the trailer, for trailer 200, for example, cargo container 202 and 204 may be 10 foot containers, while cargo container 206 may be a 20 foot container. Similarly, for cargo trailer 300, cargo containers 302 and 304 may represent either 10 or 20 foot containers, depending upon the length of the cargo bed. In any case, it may be seen that the trailering system of the present invention may conveniently present twice the number of cargo containers as trailers utilized to haul the same, and at least four times the number of such containers as tractors needed to make a given run.

As shown by the arrow in view B of FIG. 1, the preferably interlocked dolly 400-trailer 200 unit is backed towards trailer 300 in order to interconnect dolly fifth wheel 404 with kingpin 310. For this interconnection process it will be noted that axle assemblies 314 and 316 of trailer 300 have been moved to relatively opposing ends of track 318, which is the trailer storage position. Similarly, the dolly 400 has had its axle assemblies 406 and 408 moved to opposing ends of its frame track 410, whereupon the proper coupling heights between fifth wheel 404 and kingpin 310 have been established.

In view C of FIG. 1, the interconnection between dolly 400 and trailer 300 has been completed. As will be described more fully hereinafter, means are provided for similarly interconnecting trailer 300 with dolly 400 to prevent relative pivotal movement therebetween. Accordingly, in the fully linked mode, the entire trailer system will remain rigid, and therefore may be backed and otherwise manuevered, within limits, by the tractor as if a single long trailer unit.

In most instances hauling and maneuvering in the forward direction will be accomplished by allowing each trailer and the dolly to pivot with respect to each other. After linkage has been completed, as shown in view C of FIG. 1, appropriate repositioning of the axles may be accomplished in order to optimize weight distribution and maneuvering capability. One such reorientation of axle positions has been accomplished in step D of FIG. 1. In this view, axle assemblies 214 and 216 have not been moved from their rearmost running position, as originally illustrated. It may be seen, however, that the relative positions of these axles along track 218 of trailer 200 may be varied to affect the weight distribution of the cargo load, as well as, the relative pivot point of the cargo bed with respect to rear kingpin 210. These axle positions may therefore be modified to adjust the tracking behavior of both dolly 400 and indirectly trailer 300.

In view D, dolly axle assembly 408 and trailer axle assembly 316 have been relatively shifted to their rearmost positions adjacent axle assemblies 406 and 314 respectively. This axle assembly movement has been accomplished by selectively releasing the means otherwise locking axle assemblies 408 and 316 to tracks 410 and 318 respectively, by fixing the brakes on wheels 408 and 316, and by moving the remainder of the apparatus relatively forward as illustrated by the arrow in view D, first to move axle assembly 408 into the position shown, and then after releasing the brakes on axle assembly 408 and locking that axle assembly with respect to frame 410, by continuing in the forward direction until axle assembly 316 assumes the position shown in view D. The relative positioning of the dolly axle assemblies 406 and 408 relative to dolly track 410, as well as the relative positioning of axle assemblies 314 and 316 along trailer track 318 will, as discussed above, establish the relative pivot points, load distribution and overall behavior of these components within the system.

As seen from the above description, it is contemplated that the novel dolly-and-trailer apparatus of the present invention will facilitate the transport of a large number of containers, each of which may be loaded on a trailer in a position presenting the end loading doors so that, with a minimum amount of effort, each of the containers may be end loaded or unloaded to a conventional loading dock.

In addition to the features of the trailer described in my aforementioned patent application, both the trailers and the dolly of the present invention are also fitted with removable service brackets 220 and 222 for trailer track 218, 420 and 422 for dolly track 410, and 320 and 322 for trailer track 318. These service brackets, the structure of which will be described more fully hereinafter, prevent the axle assemblies from sliding off the ends of their respective tracks during the normal operation of the trailer, but may be easily removed when it is desired to remove, substitute, or add axle assemblies to the trailer. In this manner, depending upon the load which is to be transported, it is only necessary to select the proper cargo bed and fit that bed with the required number of axle assemblies needed in order to adequately transport the load. Accordingly, where light loads are to be hauled and only one or two axle assemblies necessary, additional axles may be removed from a given trailer so that extra axle-assembly weight need not be transported. Conversely, for extremely heavy loads a conventional trailer may simply be modified by removing the service brackets from one end of the track and by sliding additional axle assemblies thereon until the load may be accommodated.

Figure 2:
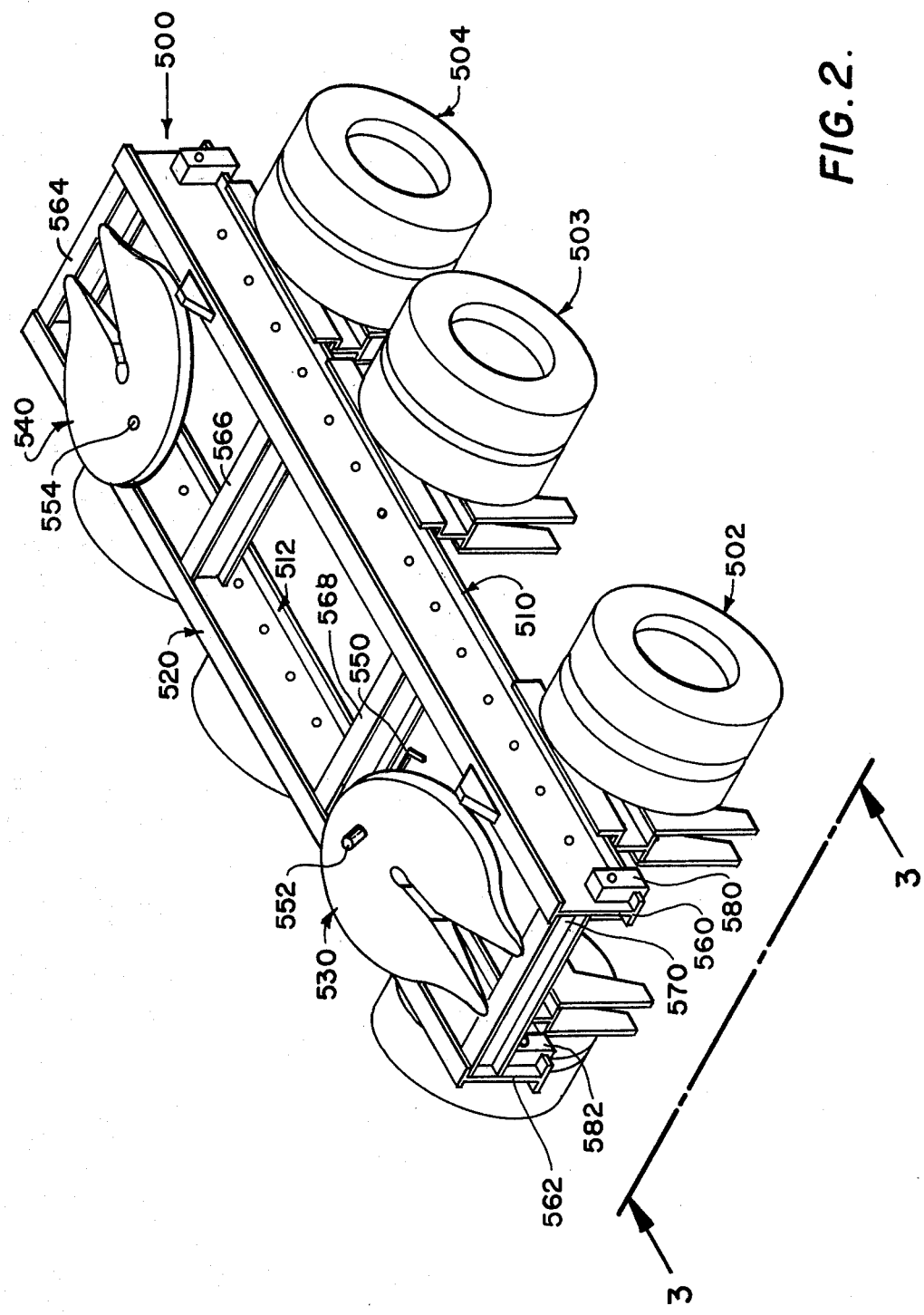
FIG. 2 is a greatly enlarged perspective view of the preferred embodiment dolly having three axle assemblies mounted thereon.
Figure 3:
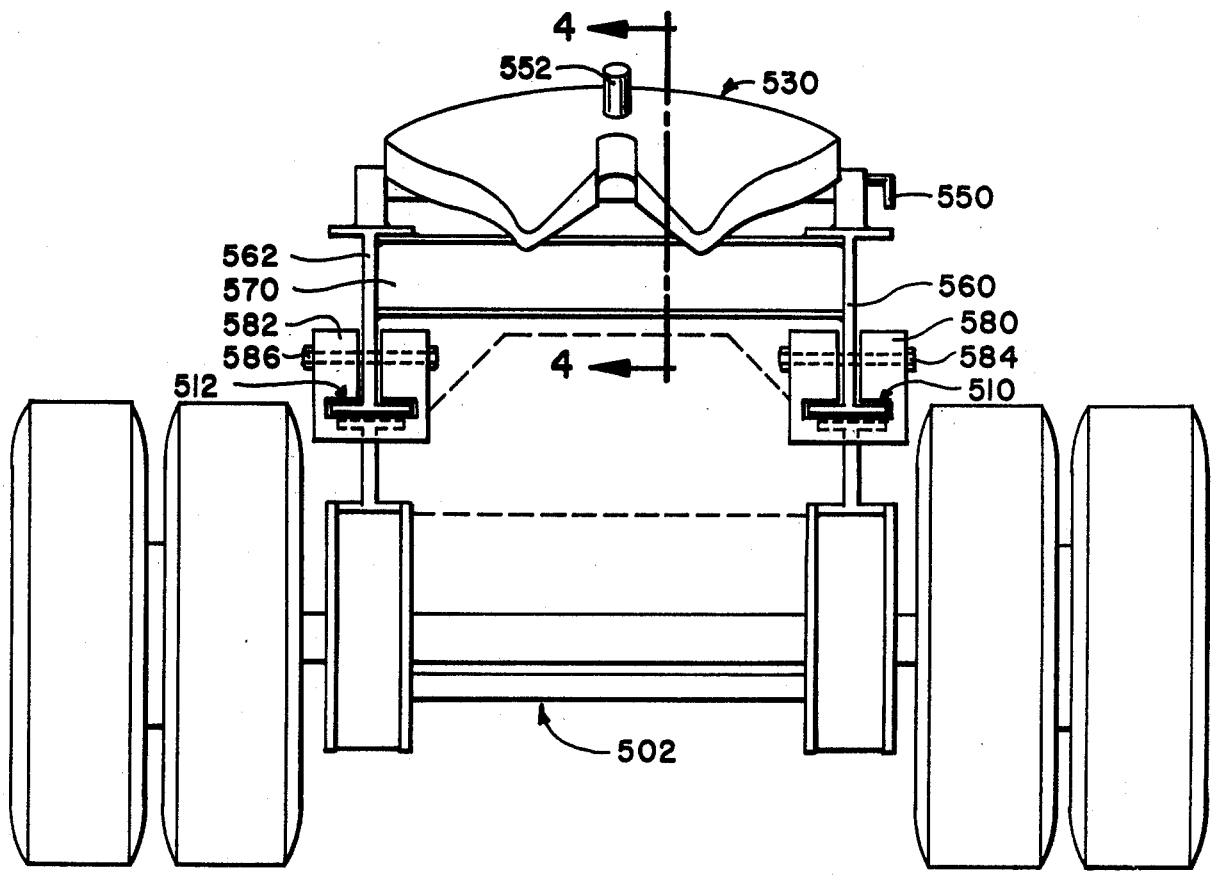
FIG. 3 is a greatly enlarged end view of the preferred embodiment dolly illustrated in FIG. 2, taken as indicated by the lines and arrows 3—3 in FIG. 2.

The service brackets function in a similar manner when incorporated on the preferred embodiment dolly, and are shown with clarity in FIGS. 2 and 3 of the present application. Referring now to FIG. 2, an embodiment of the dolly designated generally 500 is illustrated in an isometric view having three axle assemblies designated generally 502, 503 and 504 mounted for selective sliding movement along dolly track 510 thereof. As seen in FIG. 2, in addition to the axle assemblies, the dolly comprises a substantially elongate frame designated generally 520, the lower portion of which forms the dolly tracks designated generally 510 and 512 respectively. On the upper surface of opposite ends of the elongate frame 510 are mounted two fifth wheels designated generally 530 and 540, each of which fifth wheels is mounted in a conventional manner on the frame and comprises a conventional slot and the standard gripping assembly used by the industry for receiving and pivotally engaging a kingpin introduced therein (the kingpin engagement assembly is not shown in the drawings, but is generally manually activated by a lever mounted on the side of the fifth wheel). Fifth wheel 530 is shown having an additional locking mechanism which may be activated by rotating lever 550 to cause a pin 552 to protrude from the locking aperture 553. Alternatively, where it is desired to provide the active portion of the locking means on the trailer, rather than the dolly, the fifth wheel may be merely provided with an aperture as for example 554 shown on fifth wheel 540 in FIG. 2, which aperture is oriented to mate with the piston rod of a pneumatic cylinder mounted to the undercarriage of the trailer assembly so that the dolly may be axially aligned with respect to the trailer, and then locked in that position by either of the aforementioned locking means.

As seen from FIGS. 2 and 3, the structure of the dolly assembly is relatively simple. Main transverse "I"-beam 560 and 562 run the length of the dolly and form in combination with transverse "I"-beams 564, 566, 568, and 570 and integrally welded frame assembly comprising a suitable upper fifth wheel mounting surface. The lower portions of the main "I"-beams 562 and 560 form dolly track means 512 and 510 respectively, which track means may be seen to comprise a plurality of periodically spaced apertures formed in the lower central portion of the main "I"-beams for receiving the locking pins of the wheel assemblies when those wheel assemblies are to be fixed with respect to the dolly. As seen particularly in FIG. 3, the structure of the axle assemblies (502 in FIG. 3), and particularly the sliding interengagement between the axle assemblies and the tracking portions 510 and 512 of main "I"-beams 560 and 562, are identical to those disclosed for the preferred embodiment in my aforementioned copending patent application. The service brackets 580 and 582 comprise substantially box-shaped members having a t-shaped channel formed therethrough adapted to matingly receive the lower terminal ends of the tracking 510 and 512 of the main longitudinal "I"-beams of the dolly. These service brackets 580 and 582 are removably attached to the ends of the tracking portions by means of bolts 584 and 586 or other similar fastening means which may be easily attached to the service bracket to the "I"-beam through an existing axle interlock aperture in the "I"-beam. Thus, it may be seen that in those instances where the maximum bridging distance must be attained, and the safety advantages of the service brackets not desired, the service brackets may be removed and the apertures otherwise utilized by the locking pins associated with the axle assemblies, to thereby facilitate the endmost positioning of those assemblies with respect to the dolly.

Figure 4:
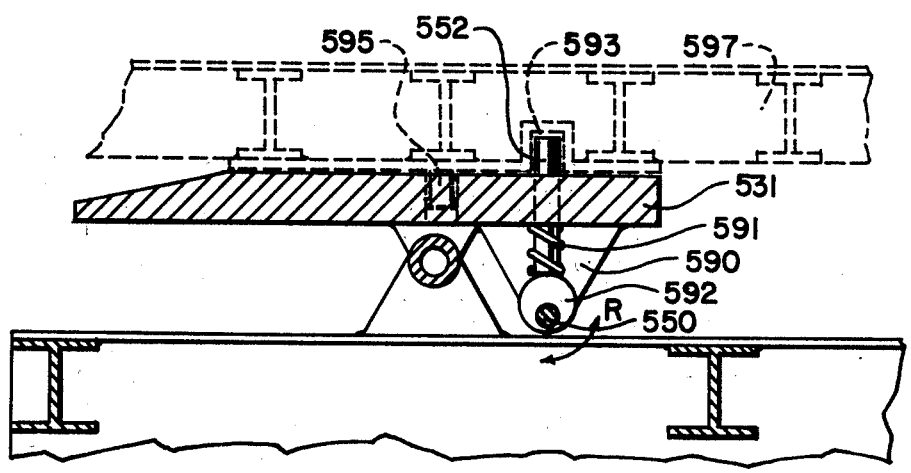
FIG. 4 is a cross-section of a portion of the dolly fifth wheel shown in FIG. 3, taken as indicated by the lines and arrows 4—4 in FIG. 3.

Referring now in particular to FIG. 4, which is a cross-section of a portion of the fifth wheel illustrated in FIG. 3 shown hitched to a phantom-illustrated trailer coupling portion, the structure of the fifth wheel locking pin assembly for preventing pivotal displacement of the dolly with respect to the trailer is illustrated. Handle 550, the shaft of which is shown in cross-section in FIG. 4, is seen to be pivotally mounted on a plurality of bearing block brackets 590. An eccentric cam 592 is attached to shaft 550 and is oriented under a spring-biased pin 552 which is journalled within a bore formed in the fifth wheel plate 531 by utilizing spring 591 to bias the pin 552 away from the trailer. An additional margin of safety is therefore provided during transit by preventing the inadvertent interlocking of the fifth wheel with respect to the trailer. Rotation of the shaft 550 in the directions shown by arrow R in FIG. 4, alternately withdraws or inserts pin 552 into an appropriate pivot interlock bore 593 formed in the undersurface of the trailer axially adjacent trailer kingpin 595. Accordingly, as illustrated in FIG. 4, pivotal movement of the dolly with respect to the trailer is effectively restrained for maneuvering purposes.

From the foregoing description, it may be seen that the trailer system of the present invention is simple, inexpensive, flexible, and provides superior advantages to those tandem trailer hauling systems heretofore known to the art. In particular, each trailer, and the dolly to be utilized therebetween, may be tailored to handle the particular load to be carried, utilizing one or more standard axle assemblies which may simply be slid onto or from either the trailers or dolly desired for a given haul. By relying upon the best known methods of facilitating an interconnection between trailers, namely that of a standard fifth wheel-kingpin couple, the trailer system of the present invention provides superior safety. The maneuverability for a tandem trailer system is also maximized not only by utilizing a plurality of variously sized trailers and/or dollies, but also by positioning the wheels of each trailer and dolly with respect to each other and with respect to their respective associated trailers or dollies, such that the pivotal action of those trailers maximizes the maneuverability of the unit. For example, a wheel positioning heretofore unacceptable for highway speeds due to "whipping" or "jack-knife" problems may now be utilized at low speeds in densely populated areas for increased maneuverability in tight quarters. Conversely, after leaving metropolitan areas, the axle assembly positioning may be re-adjusted to achieve maximum safety at highway speeds.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for transporting a plurality of cargo containers, said apparatus being selectively coupleable to the fifth wheel of a tractor, comprising:
   (a) a first elongate trailer comprising at least two coupling means, at least one disposed at each end thereof, for selective pivotal coupling with a tractor's fifth wheel;
   (b) a second elongate trailer comprising at least one coupling means for selective pivotal coupling with said tractor's fifth wheel; and
   (c) a dolly means comprising at least two fifth wheels positioned for coupling with said coupling means of said first and said second trailers to tandem link said trailers, said dolly means further comprising a substantially elongate frame having at least two fifth wheels mounted at opposing ends thereof, and further comprising a plurality of axle means for supporting said elongate frame, said axle means being slidable along substantially the entire length of said frame for positioning at any of a plurality of preselected positions along said frame, and being slidable relative to each other as well as to said frame, said dolly frame further comprising at least two parallel tracking members engaging each of said axle means.

2. The invention of claim 1 wherein each of said axle means comprises track interlock means for locking said axle means with respect to said dolly frame at any of a plurality of preselected positions along said frame.

3. The invention of claim 1 wherein said dolly further comprises a plurality of removable service brackets for limiting the path of travel of said axle assemblies along said dolly track.

4. The invention of claim 3 wherein said service brackets comprise substantially box-shaped members having generally T-shaped channels defined therethrough.

5. The invention of claim 4 wherein said service brackets further comprise bolts adapted to extend between portions of said service bracket through an aperture defined in the tracking means of said dolly frame.

6. An apparatus for transporting a plurality of cargo containers, said apparatus being selectively coupleable to the fifth wheel of a tractor, comprising:
   (a) a first elongate trailer comprising at least two coupling means, at least one disposed at each end thereof, for selective pivotal coupling with a tractor's fifth wheel;
   (b) a second elongate trailer comprising at least one coupling means for selective pivotal coupling with said tractor's fifth wheel;
   (c) a dolly means comprising at least two fifth wheels positioned for coupling with said coupling means of said first and said second trailers to tandem link said trailers; and
   (d) means for selectively preventing pivotal movement of said dolly means with respect to at least one of said trailers to said dolly means has been coupled, said means comprising at least one retractable pin which is journaled within a bore formed through at least one of said dolly fifth wheels, which pin is generally biased away from said trailer, said means for preventing pivotal displacement further comprising an eccentric cam means for selectively extending and retracting said pin.

7. A method of receiving, transporting and presenting to a loading dock, $x$ number (where $x$ is an integer greater than 2) of end-access door cargo containers, said method comprising the steps of:
   (a) providing $y$ number ($y$ being the nearest whole integer, rounded down, of the value of $x$ divided by 2) elongate trailers of sufficient length to receive at least two of said end access cargo containers, each of said trailers having at least two coupling portions disposed at generally opposing ends thereof for alternative coupling to a tractor's fifth wheel;
   (b) loading at least $x - 1$ number of said end-access door cargo containers onto said trailers with their access doors located at said generally opposing ends of said trailer;
   (c) providing, when the value of $x$ divided by 2 is not a whole integer:
      (i) at least one additional elongate trailer having at least one coupling portion at one end thereof for selectively coupling to said trailer's fifth wheel; and
      (ii) loading at least one of said end-access door cargo containers onto said additional elongate trailer with its access doors located at the opposite end of said additional trailer from said coupling portion;
   (d) tandem coupling said $y$ number of trailers between adjacent coupling portions of said trailers utilizing $y - 1$ number of dollies, each having a plurality of fifth wheels mounted on a frame spanning therebetween, said fifth wheels engaging said coupling portions, to thereby form a cargo train;
   (e) hauling said train through a tractor's fifth wheel coupled to a coupling means of one of said $y$ number of tractors;
   (f) uncoupling said trailers from said dollies; and
   (g) coupling said tractor successively to alternate ends of each of said $y$ numbers of trailers to thereby maneuver said $x$ number of containers into said loading docks to successively present each end axis door of each cargo container to said loading docks, to thereby facilitate access to each of said containers.

8. The invention of claim 7 wherein at least each of said $y$ number of trailers comprise track means spanning at least the length of said trailer between said coupling means, and having slidably mounted therealong at least a plurality of axle assemblies relatively movable with respect to one another and with respect to the trailer to thereby facilitate alternate end hauling of said trailer by said tractor attached to either of said coupling portions.

* * * * *